United States Patent
Zhou

(10) Patent No.: US 8,175,363 B2
(45) Date of Patent: May 8, 2012

(54) SYSTEM AND METHOD FOR ADDITIVE SPATIAL/INTENSITY DECOMPOSITION OF MEDICAL IMAGES

(75) Inventor: Xiang Zhou, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 841 days.

(21) Appl. No.: 12/270,141

(22) Filed: Nov. 13, 2008

(65) Prior Publication Data

US 2009/0129641 A1 May 21, 2009

Related U.S. Application Data

(60) Provisional application No. 60/989,642, filed on Nov. 21, 2007.

(51) Int. Cl.
*G06K 9/00* (2006.01)
(52) U.S. Cl. .................................................. 382/131
(58) Field of Classification Search .............. 382/128, 382/130, 131, 132
See application file for complete search history.

(56) References Cited

U.S. PATENT DOCUMENTS

| 2002/0028006 A1 | 3/2002 | Novak et al. |
| 2006/0023966 A1 | 2/2006 | Vining |
| 2006/0025674 A1 | 2/2006 | Kiraly et al. |
| 2007/0081712 A1 | 4/2007 | Huang et al. |

*Primary Examiner* — Jurie Yun
(74) *Attorney, Agent, or Firm* — Peter Withstandley

(57) ABSTRACT

A method for decomposing digital medical images includes providing a digital medical image, segmenting the image into one or more biological structures, extracting one or more segmented biological structures from the image by extracting all voxels within a spatial extent of each of the biological structures to construct one or more new component volumes of the biological structures. For each of the one or more new component volumes, generate a sequence of 2-dimensional projective views by moving a projection viewpoint around each the biological structure in the one or more new component images, and generate a 2-dimensional projective view from each viewpoint, and display a cine loop of the sequence of projective views where the biological structures appear to be rotating in the display.

27 Claims, 5 Drawing Sheets

SYSTEM AND METHOD FOR ADDITIVE SPATIAL/INTENSITY DECOMPOSITION OF MEDICAL IMAGES

CROSS REFERENCE TO RELATED UNITED STATES APPLICATIONS

This application claims priority from "Additive Spatial/Intensity Decomposition of Medical Images based on Parsed Anatomical Structures and Its Presentation Using Projective Views", Provisional Application No. 60/989,642 of Xiang Zhou, filed Nov. 21, 2007, the contents of which are herein incorporated by reference in their entireties.

TECHNICAL FIELD

This disclosure is directed to new ways of separating and presenting information a contained in medical images, such as positron emission tomography (PET), computed tomography (CT), and magnetic resonance imaging (MRI), etc., to the user.

DISCUSSION OF THE RELATED ART

The diagnostically superior information available from data acquired from current imaging systems enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital images are created from an array of numerical values representing a property (such as a grey scale value or magnetic field strength) associable with an anatomical location points referenced by a particular array location. The set of anatomical location points comprises the domain of the image. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels. Computer-aided diagnosis ("CAD") systems play a critical role in the analysis and visualization of digital imaging data.

The efficient visualization of volumetric datasets is important for many applications, including medical imaging, finite element analysis, mechanical simulations, etc. The 3-dimensional datasets obtained from scanning modalities such as computed tomography (CT), magnetic resonance imaging (MRI), positron emission tomography (PET), ultrasound (US), etc., are usually quite complex, and contain many different objects and structures. In many instances, it is difficult to distinguish between two different objects that have similar intensity values in the imaged data. In other cases, the region of interest to the user is surrounded either partially or completely by other objects and structures. There is often a need to either remove an obstructing surrounding object, or to keep the region of interest and remove all other objects. For computer aided medical decision support, one of the key enablers is the presentation of information at the right time and in the right form, with minimal distortion of the original information.

Visualization of an image can be accomplished by a maximum intensity projection (MIP), a method for 3D data that projects in a 2D visualization plane those voxels with maximum intensity in a path of parallel rays traced from a viewpoint of a hypothetical camera to the plane of projection. Thus, two MIP renderings from opposite viewpoints are symmetrical images. This technique is computationally fast, but the 2D results do not provide a good sense of depth of the original data. To improve the sense of 3D, animations such as cine loops can be rendered of several MIP frames in which the viewpoint is slightly changed from one to the other, thus creating the illusion of rotation. A cine loop is the continuous display of a set of images or frames that convey the effect of motion. This helps a viewer's perception to find the relative 3D positions of object components. However, since the projection is orthographic, the viewer cannot distinguish between left or right, front or back and even if the object is rotating clockwise or counter-clockwise. The use of depth weighting during production of the rotated MIP frames can avoid the difficulty of distinguishing right from left, and clockwise from counter-clockwise rotation.

MIP imaging is used routinely by physicians in interpreting Positron Emission Tomography (PET) imaging studies. MIP is also used for the detection of lung nodules in lung cancer screening programs which utilize computed tomography (CT) scans. MIP enhances the 3D nature of these nodules, making them stand out from pulmonary bronchi and vasculature. However, bones and other high intensity structures can create challenges for these types of images, as the intensity of bone voxels in a CT image volume is such that bone voxels can occlude tissue voxels of greater interest for analysis.

SUMMARY OF THE INVENTION

Exemplary embodiments of the invention as described herein generally include methods and systems for decomposing an image into two or more image components where each contains a portion of the original image. Methods and systems according to embodiments of the invention are application to images acquired from any of the imaging modalities such as are known in the art, such as positron emission tomography (PET), computed tomography (CT), single photon emission computed tomography (SPECT), and magnetic resonance imaging (MRI).

According to an aspect of the invention, there is provided a method for decomposing digital medical images, including providing a digital medical image, comprising a plurality of intensities associated with an N-dimensional grid of points, segmenting the image into one or more biological structures, extracting one or more segmented biological structures from the image by extracting all voxels within a spatial extent of each of the biological structures to construct one or more new N-dimensional component volumes of the biological structures, for each of the one or more new component volumes, generating a sequence of 2-dimensional projective views by moving a projection viewpoint around each the biological structure in the one or more new component images, and generating a 2-dimensional projective view from each viewpoint, and displaying a cine loop of the sequence of projective views where the biological structures appear to be rotating in the display.

According to a further aspect of the invention, the method includes labeling the segmented one or more anatomical structures.

According to a further aspect of the invention, the biological structure is one of an anatomical structure and a diseased structure.

According to a further aspect of the invention, the anatomical structure is one selected from a group comprising a lung, heart, liver, brain, kidney, colon and bladder.

According to a further aspect of the invention, the diseased structure is one selected from a group comprising a calcification, fibrosis, emphysema, cyst, tumor, cancer, and pathological lymph nodes.

According to a further aspect of the invention, the method includes generating a remaining image by subtracting the voxel intensities of the new component volumes from the image, generating a sequence of 2-dimensional projective views for the remaining image by moving a projection viewpoint around the anatomical structure in the remaining image and generating a 2-dimensional projective view from each viewpoint, and displaying a cine loop of the sequence of projective views in the display.

According to a further aspect of the invention, the method includes determining an intensity threshold for the biological structure in the new component image, identifying those voxels within the biological structure whose intensity is at least above the threshold, and constructing a structure in a second new component image from the above-threshold voxels.

According to a further aspect of the invention, the threshold is determined by a statistical analysis of the structure's intensity distribution by fitting a prior distribution of the intensity within the structure, and setting the threshold to select those voxels whose intensity values are outliers in the prior distribution.

According to a further aspect of the invention, the prior distribution is one selected from a group comprising a Gaussian distribution and a prior knowledge.

According to a further aspect of the invention, the above-threshold voxels are extracted to construct the new component volume leaving behind those voxels whose intensity is below threshold.

According to a further aspect of the invention, the new component volume is constructed by copying the above-threshold voxels, subtracting the threshold, and assigning the difference to the new component volume voxels, and leaving the above-threshold voxels within the original structure with an intensity equal to the threshold.

According to another aspect of the invention, there is provided a method of decomposing digital medical images, the method including providing a digital medical image, comprising a plurality of intensities associated with an N-dimensional grid of points, segmenting the image into one or more biological structures, identifying those voxels within one or more biological structure whose intensity is at least above a threshold, extracting the above-threshold voxels from the image to construct from the above-threshold voxels one or more new V-dimensional component volume of the biological structures, generating a sequence of 2-dimensional projective views by moving a projection viewpoint around the one or more biological structure in the new component images, and generating a 2-dimensional projective view from each viewpoint, and displaying for each of the one or more biological structures a cine loop of the sequences of projective views where the biological structure appears to be rotating in the display.

According to a further aspect of the invention, the method includes determining the threshold by statistically analyzing the structure's intensity distribution, and setting the threshold to select those voxels whose intensity values are outliers in the distribution.

According to a further aspect of the invention, the method includes determining a different threshold for each biological structure.

According to a further aspect of the invention, the biological structure is a diseased structure, and where a threshold for the diseased structure is determined according to the local background of non-diseased intensities computed using a statistical analysis of the local intensity distribution by fitting a model distribution of the intensity within the structure, and setting the threshold to select those voxels whose intensity values are outliers in the distribution.

According to another aspect of the invention, there is provided a program storage device readable by a computer, tangibly embodying a program of instructions executable by the computer to perform the method steps for decomposing digital medical images.

DETAILED DESCRIPTION OF EXEMPLARY EMBODIMENTS

Figure 1:
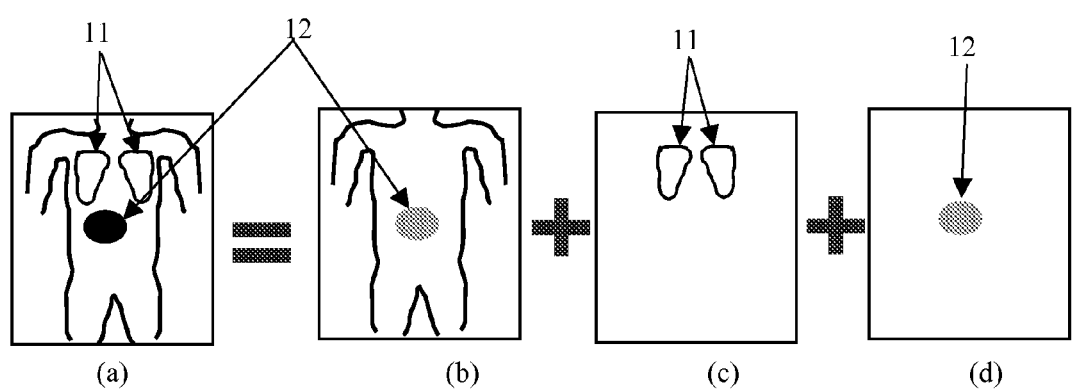
FIGS. 1($a$)-($d$) illustrate an additive aspatial/intensity decomposition of a 2D image, according to an embodiment of the invention.

Exemplary embodiments of the invention as described herein generally include systems and methods for additive spatial/intensity decomposition of medical images based on parsed anatomical structures. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

An additive spatial intensity decomposition of an image according to an embodiment of the invention is a separation of the image into two or more image components where each contains a portion of the original image, whereas the portion is defined in the spatial and/or intensity domain. In other words, the information stored in a pixel (or voxel) will be either wholly retained in one of the components or divided into two or more components. However, the decomposition is "additive", in that the sum of all components will reproduce the original image. The ability to extract a segmented structure from the original image opens up many visualization possibilities. A decomposed structure can be displayed without the obstructing effects of occlusions due to other high intensity objects in an image, such as bones. Image decomposition can be applied to images of any acquisition modality, and to images of any dimensionality, such as 2D, 3D, 3D+time, 4D, or even 6D color images. Although, for clarity of exposition, image decomposition will be described herein below in terms of 3D grayscale images, one of skill in the art can easily extend these teachings to other dimension images.

FIGS. 1(a)-(d) illustrate an additive spatial/intensity decomposition of a 2D image (FIG. 1(a)) depicting the lungs 11 and a tumor 12. The lungs 11 are spatially decomposed in FIG. 1(c), while the tumor 12 is spatially and intensity-decomposed in FIGS. 1(b) and (d).

An additive spatial/intensity decomposition of a 3D volume is performed in the same manner, but in the 3D space instead of 2D. It makes sense to decompose the liver in a PET image spatially, with no intensity subdivisions, however, for a liver lesion, it is useful to perform both a spatial and an intensity based decomposition as the lesion can be distinguished from healthy tissue by its elevated intensity values. For example, according to an embodiment of the invention, a baseline uptake of the lesion that is equal to normal liver tissue uptake is retained in the liver, with only the residual part shown in a separate component.

In situations where there is a non-zero additive background, according to other embodiments of the invention, one can use a spatial/intensity decomposition instead of a purely spatial decomposition.

Figure 2:
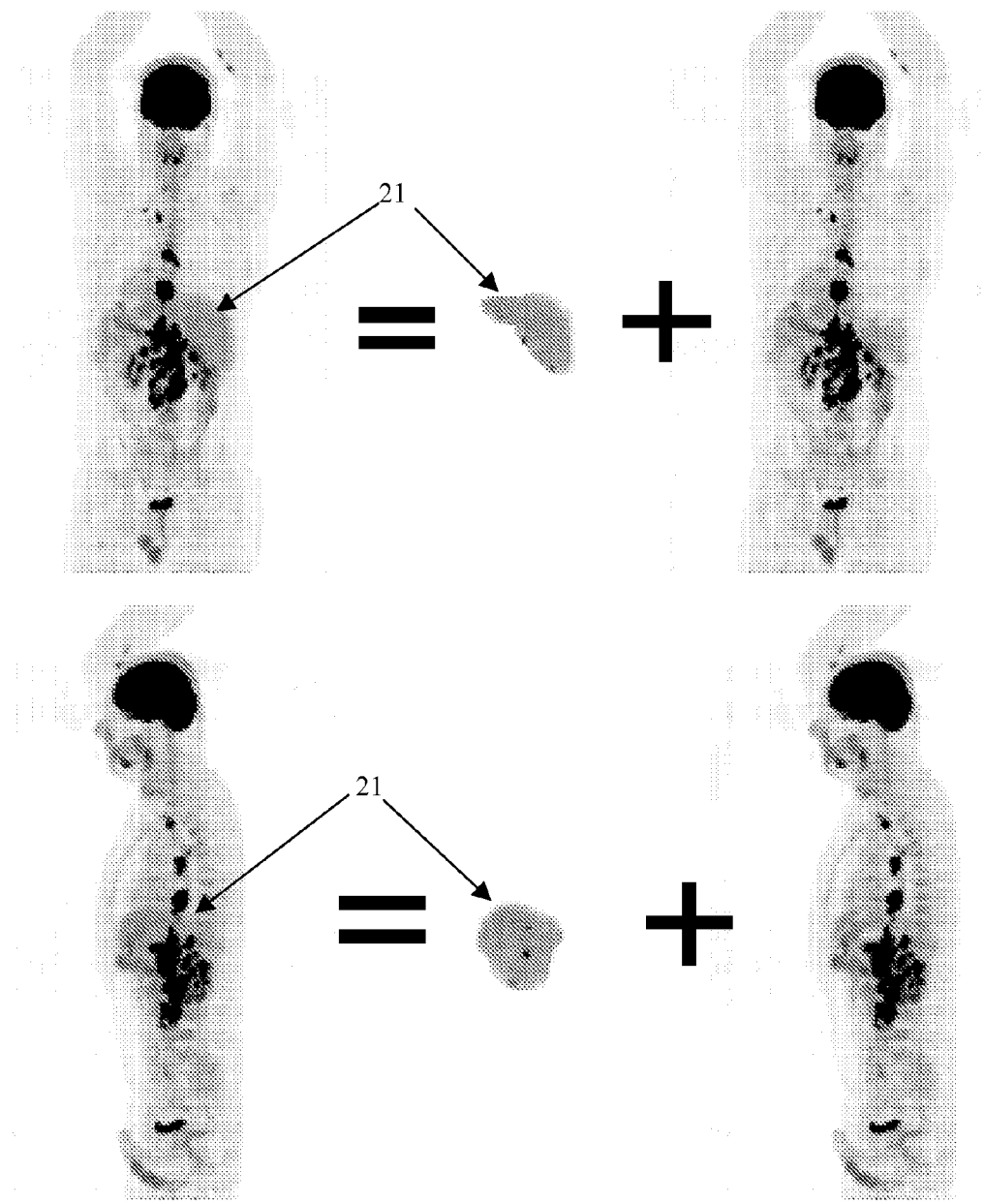
FIG. 2 is a maximum intensity projection of an original PET volume, and its organ-based decomposition with two components, according to an embodiment of the invention.
Figure 3:
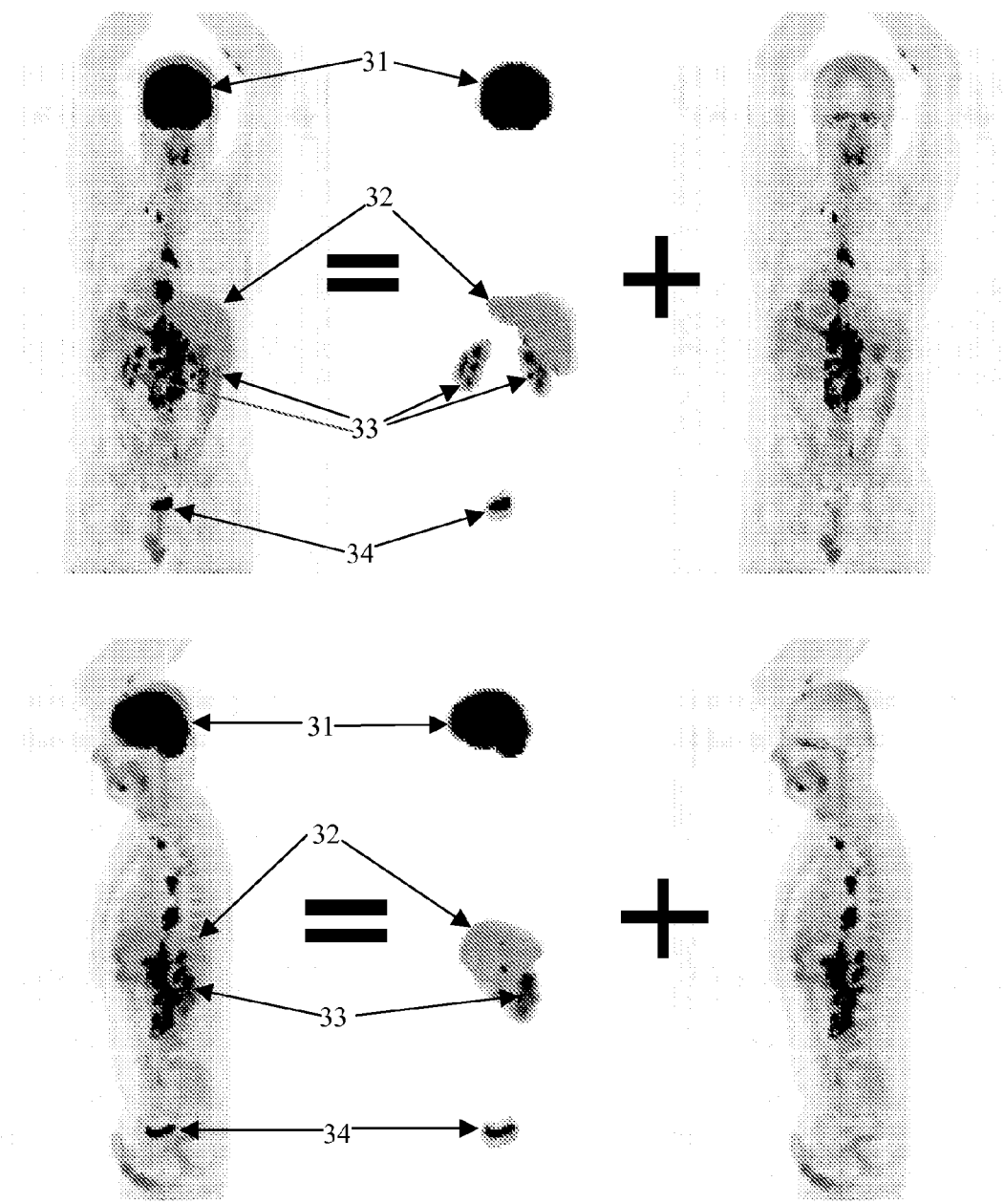
FIG. 3 is another maximum intensity projections of an original PET volume, and its organ-based decomposition with two components, according to an embodiment of the invention.

FIGS. 2 and 3 show maximal intensity projective (MIP) views of a spatially decomposed PET volume. For each figure, the upper image is a front view, and the lower figure is a side view, where the viewpoint of the MIP was rotated by 90 degrees. These views can be thought of as snapshots from an MIP animation of a rotating body. Note that the "+" and "=" signs in these figures are symbolic, not literal, as the equation does not hold for the pixel values in the MIP image, but instead only for the original decomposed PET volumes, before the MIPs were computed. PET scans involve the injection into a patient's body of a radioactive sugar that emits positrons. Those regions that have an elevated metabolism or concentration of sugars, such as tumors, the brain, liver, kidneys, and bladder, will appear as hot spots in a PET image volume. In particular, FIG. 2 depicts maximum intensity projections of an original PET volume and its organ-based decomposition with two components, where the first one contains a liver 21, while the second one has no liver, while FIG. 3 depicts maximum intensity projections of an original PET volume and its organ-based decomposition with two components, where the first one contains a brain 31, liver 32, kidneys 33, and bladder 34, and the second image contains none of these organs.

According to other embodiments of the invention, any combination of the multiple projective views can be shown.

An image decomposition method according to an embodiment of the invention is enabled by anatomical structure parsing. Parsing of the an anatomical structure refers to image segmentation with either none, some, or all of the anatomical structures annotated, for example, labeled by their names. The output of an anatomical parser is a set of labels, such as "brain", "lung", "liver", "ROI", "VOI", "background", etc., each assigned to zero or more pixels in the source image. Note that these labels are exemplary and non-limiting, and need not be text strings. In other embodiments of the invention, the labels can be, for example, numeric. Once an organ or other object in an image has been segmented and identified, it can be extracted in a spatial decomposition.

The parsing of anatomical structure can be manual, semi-automatic, or fully automatic. Automatic parsing techniques have been described in this inventor's copending patent applications, U.S. Patent Application Publication Nos. 20070081712, 20070081706, and 20060239527, the contents of all of which are herein incorporated by reference in their entireties.

An exemplary, non-limiting, parsing algorithm according to an embodiment of the invention is as follows. First, manually mark a delineation boundary surface for an anatomical structure (e.g., kidney) in a medical image and assign anatomical landmarks on the surface. The annotated boundary surface can be represented as a mesh embedded within a 3D image volume. Next, given a new medical image, detect the same set of anatomical landmark points in the medical images. Then, deform every mesh point of the annotated surface onto the new medical image, using a smooth transformation defined optimized by matching up the two sets of anatomical landmarks. Exemplary, non-limiting transformations include an affine transformation and a similarity transformation.

Figure 4:
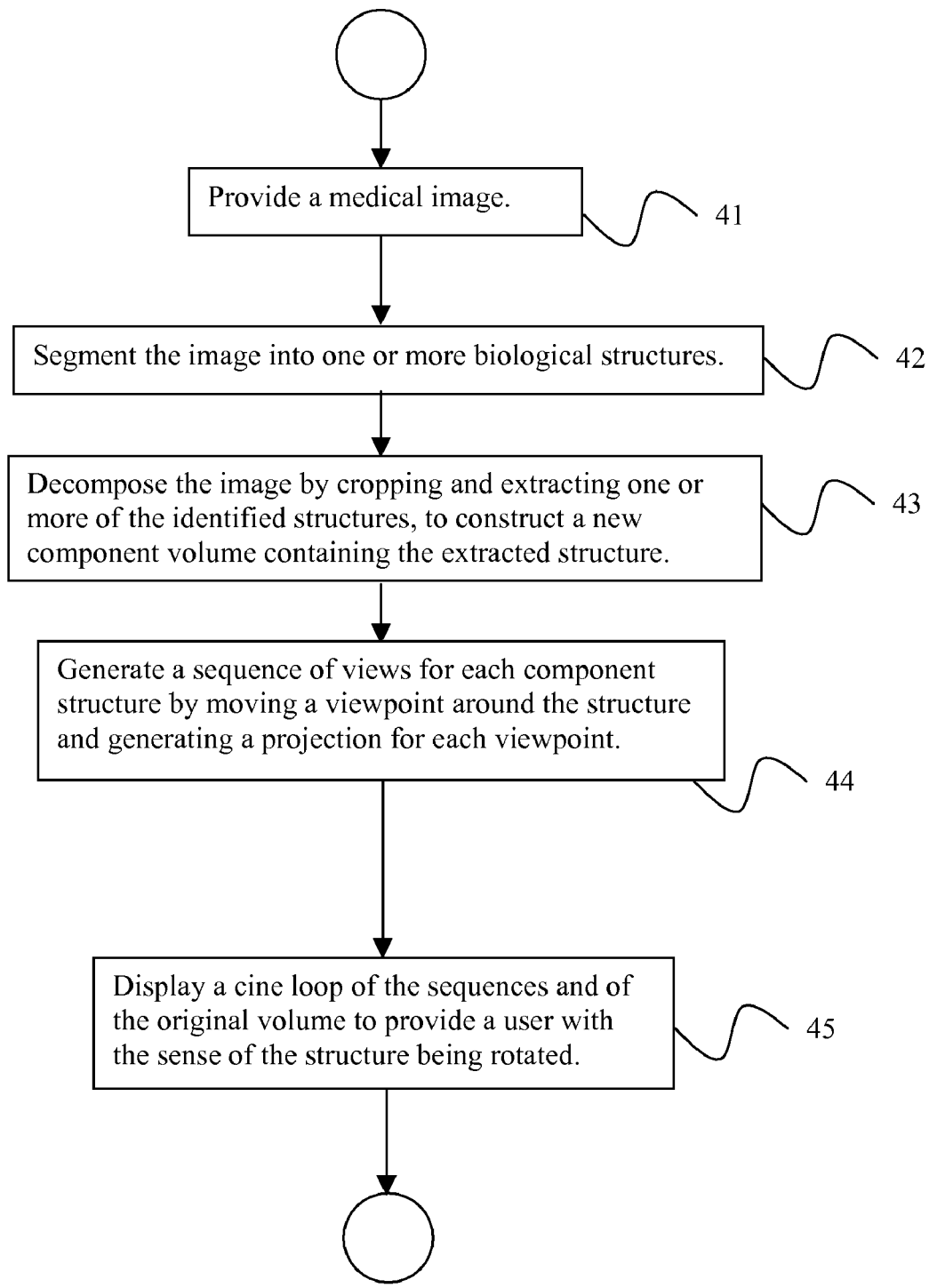
FIG. 4 is a flow diagram of a method for additive spatial/intensity decomposition of medical images based on parsed anatomical structures, according to an embodiment of the invention.

A flowchart of a method for decomposing an image, according to an embodiment of the invention, is presented in FIG. 4. It can be assumed without limitation that the image has been segmented into one or more structures. These structures can be organs, such as the lungs or liver, or diseases, such as tumors inside the lung detected by an automatic computer-aided detection algorithm. Referring now to the figure, at step 41, a 3D medical image volume is provided. The image is segmented into one or more anatomical or diseased structures, using, for example, one of the above disclosed parsing methods, and identifying labels are assigned to structures of interest at step 42.

At step 43, the image is decomposed. One or more of the identified structures, possibly including the background volume, is cropped and extracted to construct a new component volume containing the extracted structure. Since the structures have been segmented, the boundary and spatial extent of each structure with respect to the rest of the volume is known. For a spatial decomposition, all voxels within the spatial extent of the structure are extracted for the new volume, leaving behind a region of zero intensity in the original image. For an intensity-based decomposition, those voxels whose intensity is above a local threshold, or above or equal to the threshold, are identified. In either case, those voxels that satisfy the threshold criteria shall be referred to herein as above-threshold voxels. A local threshold for a structure involves determining, for example, for a tumor in the liver, determining what is the local healthy liver tissue intensity, or for a enlarged lymph node in the mediastinum, determining what is the local soft tissue intensity surrounding the lymph node. According to an embodiment of the invention, these above-threshold voxels can be extracted to construct the new volume, leaving behind those voxels whose intensity is below threshold. According to another embodiment of the invention, a new volume is constructed by copying the above-threshold voxels, subtracting the portion of the intensity above the threshold, and assigning the difference to the new component volume voxels, and leaving the above-threshold voxels within the original structure with an intensity equal to the threshold. This achieves the effect of decomposing a diseased component from the healthy component from the original volume. The threshold can be determined by a statistical analysis of the structure's intensity histogram, and set to identify those voxels whose intensity values are outliers in the distribution, or by using a robust statistics-based estimator combined with an automatic local organ or tissue identification algorithm to employ clinical prior knowledge regarding the said local organ or tissue. According to another embodiment of the invention, the spatial and intensity decomposition can be combined, where the structure is first spatially extracted from the original volume, and the extracted component is then subjected to the intensity threshold described above.

At step 44, projective views, such as MIP views, are constructed for each component volume and for the original volume. A sequence of views can be generated for each component structure by moving the viewpoint around the structure and generating a projection for each viewpoint. The projective view for the original volume is displayed together with the views for one or more the component volumes at step 45. A cine loop of the sequences can also be displayed to provide a user with the sense of the structure being rotated. In clinical use scenarios, it is desirable show all the components and possibly the original un-processed volume as well, in order to avoid misleading the clinician into wrong diagnosis, thus a sequence of projective view can be generated for the unprocessed volume.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 5:
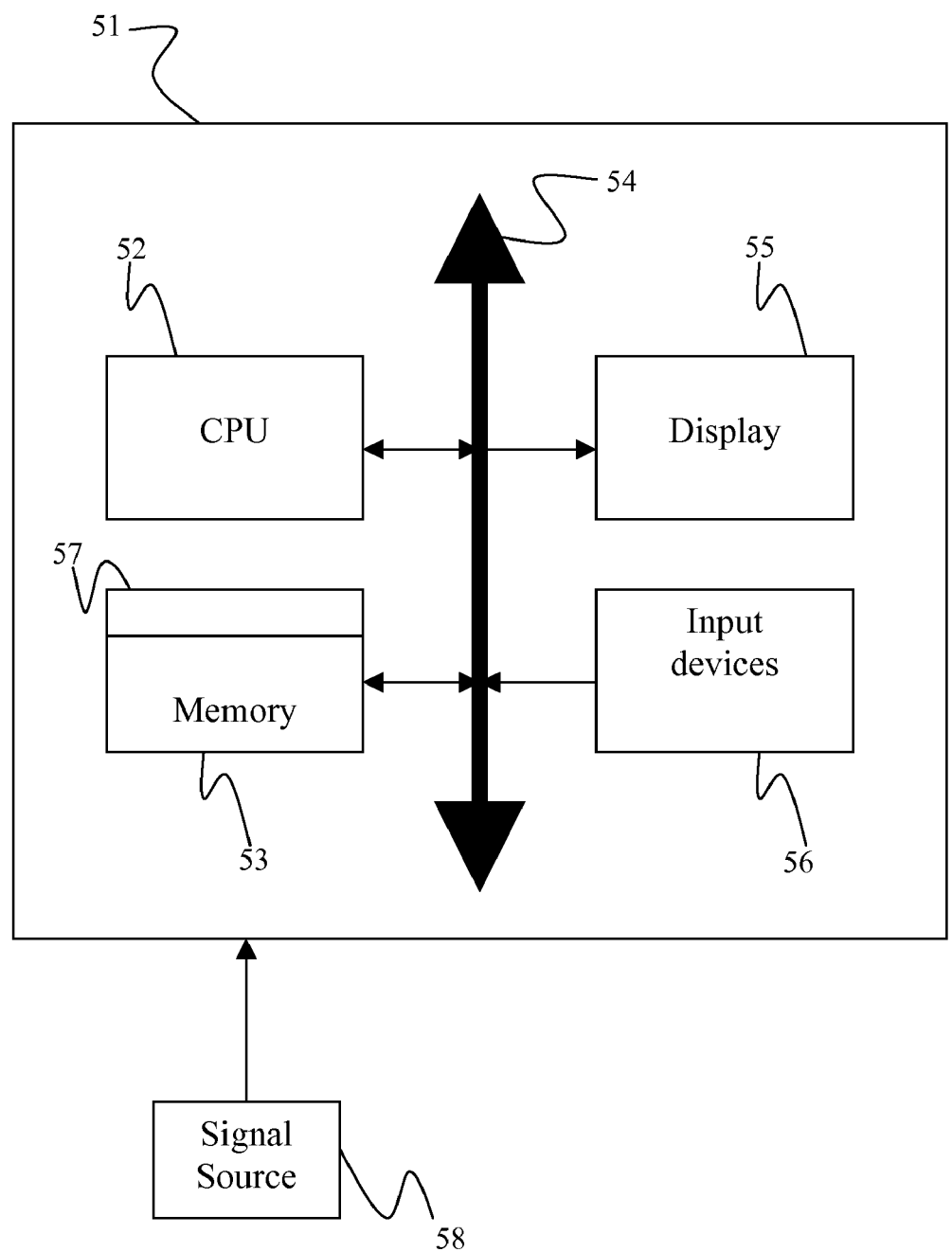
FIG. 5 is a block diagram of an exemplary computer system for implementing a method for additive spatial intensity decomposition of medical images based on parsed anatomical structures, according to an embodiment of the invention.

FIG. 5 is a block diagram of an exemplary computer system for implementing a method for decomposing an image into two or more image components where each contains a portion of the original image according to an embodiment of the invention. Referring now to FIG. 5, a computer system 51 for implementing the present invention can comprise, inter alia, a central processing unit (CPU) 52, a memory 53 and an input/output (I/O) interface 54. The computer system 51 is generally coupled through the I/O interface 54 to a display 55 and various input devices 56 such as a mouse and a keyboard. The support circuits can include circuits such as cache, power supplies, clock circuits, and a communication bus. The memory 53 can include random access memory (RAM), read only memory (ROM), disk drive, tape drive, etc., or a combinations thereof. The present invention can be implemented as a routine 57 that is stored in memory 53 and executed by the CPU 52 to process the signal from the signal source 58. As such, the computer system 51 is a general purpose computer system that becomes a specific purpose computer system when executing the routine 57 of the present invention.

The computer system 51 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment those skilled in the art will appreciate that various modifications and substitutions can be made thereto without departing from the spirit and scope of the invention as set forth in the appended claims.

What is claimed is:

1. A method of decomposing digital medical images, comprising the steps of:
   providing a digital medical image, comprising a plurality of intensities associated with an N-dimensional grid of voxels;
   segmenting said image into one or more biological structures;
   extracting one or more segmented biological structures from said image by extracting all voxels within a spatial extent of each of the biological structures to construct one or more new N-dimensional component volumes of said biological structures;
   for each of said one or more new component volumes, generating a sequence of 2-dimensional projective views by moving a projection viewpoint around each said biological structure in said one or more new component volumes, and generating a 2-dimensional projective view from each viewpoint; and
   displaying a cine loop of said sequence of projective views wherein said biological structures appear to be rotating in said display.

2. The method of claim 1, further comprising labeling said segmented one or more biological structures.

3. The method of claim 1, wherein said biological structure is one of an anatomical structure and a diseased structure.

4. The method of claim 3, wherein said anatomical structure is one selected from a group comprising a lung, heart, liver, brain, kidney, colon and bladder.

5. The method of claim 3, wherein said diseased structure is one selected from a group comprising a calcification, fibrosis, emphysema, cyst, tumor, cancer, and pathological lymph nodes.

6. The method of claim 1, further comprising:
   generating a remaining image by subtracting the voxel intensities of the new component volumes from said image;
   generating a sequence of 2-dimensional projective views for the remaining image by moving a projection viewpoint around said biological structure in said remaining image and generating a 2-dimensional projective view from each viewpoint; and
   displaying a cine loop of said sequence of projective views in said display.

7. The method of claim 1, further comprising determining an intensity threshold for said biological structure in said new component volume, identifying those voxels within the biological structure whose intensity is at least above said threshold, and constructing a structure in a second new component volume from the above-threshold voxels.

8. The method of claim 7, wherein said threshold is determined by a statistical analysis of the structure's intensity distribution by fitting a prior distribution of the intensity within said structure, and setting said threshold to select those voxels whose intensity values are outliers in the prior distribution.

9. The method of claim 8, wherein said prior distribution is one selected from a group comprising a Gaussian distribution and prior knowledge.

10. The method of claim 7, wherein said above-threshold voxels are extracted to construct said new component volume leaving behind those voxels whose intensity is below threshold.

11. The method of claim 7, wherein said second new component volume is constructed by copying the above-threshold voxels, subtracting the threshold, and assigning the difference to the second new component volume voxels, and leaving the above-threshold voxels within the original structure with an intensity equal to the threshold.

12. A method of decomposing digital medical images, comprising the steps of:
providing a digital medical image, comprising a plurality of intensities associated with an N-dimensional grid of voxels;
segmenting said image into one or more biological structures;
identifying those voxels within the one or more biological structures whose intensity is at least above a threshold;
extracting said above-threshold voxels from said image to construct from the above-threshold voxels one or more new N-dimensional component volume of said biological structures;
generating a sequence of 2-dimensional projective views by moving a projection viewpoint around said one or more biological structure in said new component volumes, and generating a 2-dimensional projective view from each viewpoint; and
displaying for each of said one or more biological structures a cine loop of said sequences of projective views wherein said biological structure appears to be rotating in said display.

13. The method of claim 12, further comprising determining said threshold by statistically analyzing the structure's intensity distribution, and setting said threshold to select those voxels whose intensity values are outliers in the distribution.

14. The method of claim 12, further comprising determining a different threshold for each biological structure.

15. The method of claim 14, wherein said biological structure is a diseased structure, and wherein a threshold for said diseased structure is determined according to the local background of non-diseased intensities computed using a statistical analysis of the local intensity distribution by fitting a model distribution of the intensity within said structure, and setting said threshold to select those voxels whose intensity values are outliers in the distribution.

16. The method of claim 12, further comprising:
generating a remaining image by subtracting the voxel intensities of the new component volumes from said image;
generating a sequence of 2-dimensional projective views for the remaining image by moving a projection viewpoint around said biological structure in said remaining image and generating a 2-dimensional projective view from each viewpoint; and
displaying a cine loop of said sequence of projective views in said display.

17. A non-transitory program storage device readable by a computer, tangibly embodying a program of instructions executable by the computer to perform the method steps for decomposing digital medical images, said method comprising the steps of:
providing a digital medical image, comprising a plurality of intensities associated with an N-dimensional grid of voxels;
segmenting said image into one or more biological structures;
extracting one or more segmented biological structures from said image by extracting all voxels within a spatial extent of each of the biological structures to construct one or more new N-dimensional component volumes of said biological structures;
for each of said one or more new component volumes, generating a sequence of 2-dimensional projective views by moving a projection viewpoint around each said biological structure in said one or more new component volumes, and generating a 2-dimensional projective view from each viewpoint; and
displaying a cine loop of said sequence of projective views wherein said biological structures appear to be rotating in said display.

18. The non-transitory computer readable program storage device of claim 17, said method further comprising labeling said segmented one or more biological structures.

19. The non-transitory computer readable program storage device of claim 17, wherein said biological structure is one of an anatomical structure and a diseased structure.

20. The non-transitory computer readable program storage device of claim 19, wherein said anatomical structure is one selected from a group comprising a lung, heart, liver, brain, kidney, colon and bladder.

21. The non-transitory computer readable program storage device of claim 19, wherein said diseased structure is one selected from a group comprising a calcification, fibrosis, emphysema, cyst, tumor, cancer, and pathological lymph nodes.

22. The non-transitory computer readable program storage device of claim 17, the method further comprising:
generating a remaining image by subtracting the voxel intensities of the new component volumes from said image;
generating a sequence of 2-dimensional projective views for the remaining image by moving a projection viewpoint around said biological structure in said remaining image and generating a 2-dimensional projective view from each viewpoint; and
displaying a cine loop of said sequence of projective views in said display.

23. The non-transitory computer readable program storage device of claim 17, the method further comprising determining an intensity threshold for said biological structure in said new component volume, identifying those voxels within the biological structure whose intensity is at least above said threshold, and constructing a structure in a second new component volume from the above-threshold voxels.

24. The non-transitory computer readable program storage device of claim 23, wherein said threshold is determined by a statistical analysis of the structure's intensity distribution by fitting a prior distribution of the intensity within said structure, and setting said threshold to select those voxels whose intensity values are outliers in the prior distribution.

25. The non-transitory computer readable program storage device of claim 24, wherein said prior distribution is one selected from a group comprising a Gaussian distribution and prior knowledge.

26. The non-transitory computer readable program storage device of claim 23, wherein said above-threshold voxels are extracted to construct said new component volume leaving behind those voxels whose intensity is below threshold.

27. The non-transitory computer readable program storage device of claim 23, wherein said second new component volume is constructed by copying the above-threshold voxels, subtracting the threshold, and assigning the difference to the second new component volume voxels, and leaving the above-threshold voxels within the original structure with an intensity equal to the threshold.

* * * * *